US010561162B2

(12) United States Patent
Lin

(10) Patent No.: US 10,561,162 B2
(45) Date of Patent: *Feb. 18, 2020

(54) METHOD OF PREPARING PALATABILITY ENHANCER

(71) Applicant: HILL'S PET NUTRITION, INC., Topeka, KS (US)

(72) Inventor: Hungwei Lin, Lawrence, KS (US)

(73) Assignee: Colgate-Palmolive Company, New York, NY (US)

( * ) Notice: Subject to any disclaimer, the term of this patent is extended or adjusted under 35 U.S.C. 154(b) by 653 days.

This patent is subject to a terminal disclaimer.

(21) Appl. No.: 15/038,545

(22) PCT Filed: Nov. 22, 2013

(86) PCT No.: PCT/US2013/071389
§ 371 (c)(1),
(2) Date: May 23, 2016

(87) PCT Pub. No.: WO2015/076818
PCT Pub. Date: May 28, 2015

(65) Prior Publication Data
US 2016/0302458 A1 Oct. 20, 2016

(51) Int. Cl.
A23L 5/00 (2016.01)
A23L 5/20 (2016.01)
A23K 10/20 (2016.01)
A23K 20/158 (2016.01)
A23K 20/142 (2016.01)
A23K 20/163 (2016.01)
A23K 20/10 (2016.01)
A23K 20/22 (2016.01)
A23K 20/174 (2016.01)
A23L 13/40 (2016.01)
A23L 13/20 (2016.01)

(52) U.S. Cl.
CPC .............. *A23L 5/21* (2016.08); *A23K 10/20* (2016.05); *A23K 20/10* (2016.05); *A23K 20/142* (2016.05); *A23K 20/158* (2016.05); *A23K 20/163* (2016.05); *A23K 20/174* (2016.05); *A23K 20/22* (2016.05); *A23L 13/20* (2016.08); *A23L 13/428* (2016.08); *A23L 13/43* (2016.08); *A23L 13/432* (2016.08); *A23V 2002/00* (2013.01)

(58) Field of Classification Search
CPC .......... A23L 5/21; A23L 13/432; A23L 27/26; A23L 27/201; A23L 27/215; A23L 13/20; A23L 27/84; A23L 13/328; A23L 13/43; A23K 20/142; A23K 20/158; A23K 20/163; A23K 20/174; A23K 20/22; A23K 50/40; A23K 50/42; A23K 10/20; A23K 20/10; A23D 7/0053; A23D 7/04
See application file for complete search history.

(56) References Cited

U.S. PATENT DOCUMENTS

| | | | |
|---|---|---|---|
| 2,100,274 A | 11/1937 | Clayton et al. | |
| 2,282,782 A | 12/1942 | Musher | |
| 2,518,233 A * | 8/1950 | Hall | A23C 3/08 252/400.2 |
| 3,413,324 A | 11/1968 | Paulus | |
| 3,780,184 A | 12/1973 | Broderick | |
| 3,976,671 A | 8/1976 | Husch | |
| 4,044,168 A | 8/1977 | Steenhock et al. | |
| 4,089,978 A | 5/1978 | Castro et al. | |
| 4,384,008 A | 5/1983 | Millisor | |
| 4,385,076 A | 5/1983 | Crosby | |
| 4,865,868 A | 12/1989 | Kuss | |
| 5,229,156 A | 7/1993 | Yokomizo et al. | |
| 5,320,862 A | 4/1994 | La Tona | |
| 5,944,012 A * | 8/1999 | Pera | A61K 9/0075 128/203.12 |
| 6,495,184 B1 * | 12/2002 | Zheng | A23L 27/215 426/533 |
| 7,455,865 B2 | 11/2008 | Buononato et al. | |
| 2003/0215547 A1 | 11/2003 | Leyh | |
| 2006/0088574 A1 * | 4/2006 | Manning | A23L 33/40 424/439 |
| 2009/0136438 A1 * | 5/2009 | Dickman | A61K 8/44 424/60 |
| 2012/0213889 A1 | 8/2012 | Chiang | |
| 2013/0122154 A1 | 5/2013 | Villagran et al. | |

FOREIGN PATENT DOCUMENTS

| | | | | |
|---|---|---|---|---|
| CN | 101331935 A | | 12/2008 | |
| DE | 968694 | | 4/1958 | |
| GB | 505844 A | * | 5/1939 | ............. C11B 13/00 |
| GB | 1115610 | | 5/1968 | |
| GB | 1273796 | | 3/1971 | |
| WO | WO2006/074087 | | 7/2006 | |
| WO | WO2007109761 | | 9/2007 | |
| WO | WO2009/095417 | | 8/2009 | |
| WO | WO2010/008452 | | 1/2010 | |

OTHER PUBLICATIONS

Farrer, "The nutritive value of yeast extract," Medical Journal of Australia, 1954, 41(3):67-71.
International Search Report and the Written Opinion of the International Searching Authority issued in International Application PCT/US2013/071389 dated Oct. 30, 2014.
(Continued)

Primary Examiner — C. Sayala

(57) ABSTRACT

Provided herein is a method of preparing a palatability enhancer for a food composition comprising: a) combining an animal fat, one or more edible agents, an alkaline agent and water at a temperature of up to 45° C. to form a mixture, wherein the edible agents are selected from amino acids, sugars, vitamins, flavorants and flavor precursors, b) heating the mixture to a temperature of 96° C. to 99° C. for at least 35 minutes, and c) obtaining a palatability enhancer from the mixture, wherein the palatability enhancer comprises animal fat in an amount of at least about 80 wt %, and wherein the method is conducted under ambient pressure. Further provided is a method of enhancing the palatablity of a food composition and a method of reducing the odor of animal fat.

14 Claims, 6 Drawing Sheets

(56) References Cited

OTHER PUBLICATIONS

Lin et al., "Maillard Products Formed from Chicken Fat Oxidants and Amino Acids Act as a Flavor Enhancer in Comminuted Chicken Products," J. of Food Science and Engineering, Mar. 2013, 3:161-167.

* cited by examiner

METHOD OF PREPARING PALATABILITY ENHANCER

CROSS-REFERENCE TO RELATED PATENT APPLICATIONS

This application is a U.S. national stage application under 35 U.S.C. § 371 of PCT Application No. PCT/US2013/071389, filed Nov. 22, 2013, the entirety of which is incorporated herein by reference.

FIELD OF INVENTION

The present invention relates to a method of preparing a palatability enhancer comprising animal fat, a method of enhancing the palatability of a food composition and a method of reducing the odor of animal fat.

BACKGROUND

Animal fats such as pork fat, chicken fat, lamb tallow, and beef tallow are widely used for making animal food products due to their nutritional values to animals and their economic value to food manufacturers. The raw materials used to produce these fats usually contain animal offal or viscera. However, the fats derived from these materials (in particular, inedible fats) usually have strong and offensive odors (such as odors of blood, footy, ammonia, and unfresh) and an undesirable, dark appearance. Furthermore, these fats are susceptible to microbial contamination.

It is thought that the free fatty acids present in animal fats, and in particular, inedible animal fats, are responsible for offensive odors. A known physical refining process for removing free fatty acids from fat/oil sources involves injecting steam into heated fat/oil under vacuum. The thermal energy and polar environment provided by the steam releases free fatty acids within the fat/oil material. These in turn evaporate under vacuum, diminishing the odor of the fats. This process is more commonly used for processing vegetable oils rather than animal fats. A known chemical refining process for removing free fatty acids from fat/oil sources involves neutralizing free fatty acids in fat/oil using an excess of caustic soda (sodium hydroxide), removing the soap stock, heating to a temperatures of up to about 88° C. (190° F.), separating saponified soap stocks through water washing, centrifuging, and drying. However, excessive saponification imparts an undesirable soapy odor to the fat/oil source and reduces process yield. Recent product development and market competition have driven pet food manufacturers to use higher grade animal fats from premium sources. However, the use of these higher grade materials is constrained by costs and sourcing. Furthermore, even these higher grade materials are still susceptible to microbial contamination.

It would be desirable to provide an improved method of processing animal fat, particularly inedible animal fat, which effectively diminishes the odor associated with fatty acids present in the fat, which imparts good aromas to the finished material, and which reduces or eliminates the risk of microbial contamination to comply with microbial safety standards, without diminishing the palatability of the fat. The method should be feasible both technologically and economically.

BRIEF SUMMARY

The present inventors have found that when animal fat, and in particular, inedible animal fat is heated with edible agents including amino acids, sugars, vitamins, flavorants and flavor precursors to a temperature of about 96° C. to 99° (~206° F. to 211° F.) in an aqueous solution at ambient pressure, the flavor characteristics of fat are altered, and undesirable odors are reduced.

After heating, the aqueous phase may be removed to provide an animal fat which has meaty, sweet, roasted or smoked characteristics that are more desirable for pet owners, and that meets the requirements of microbial safety standards. Furthermore, the present inventor has unexpectedly found that animal fat processed according to the present invention enhances the palatability of food compositions, and can further be used to replace exogenous fat added to pet food formulae (e.g. fat used to coat kibbles) without diminishing their palatability.

Accordingly, in a first aspect, the present invention provides a method of preparing a palatability enhancer for a food composition, wherein the method comprises:
a) combining an animal fat source, one or more edible agents, an alkaline agent and water at a temperature of up to 45° C. (113° F.) to form a mixture,
wherein the edible agents are selected from amino acids, sugars, vitamins, flavorants and flavor precursors, and
wherein the alkaline agent is present in an amount that does not exceed the amount required to neutralize fatty acids in the animal fat source;
b) heating the mixture to a temperature of 96° C. to 99° C. (~206° F. to 211° F.) for at least 35 minutes;
c) obtaining a palatability enhancer from the mixture;
wherein the method is conducted under ambient pressure, and
wherein the palatability enhancer comprises animal fat in an amount of at least 80 wt. %.

Typically, the palatability enhancer comprises animal fat in an amount of at least 90 wt %. Preferably, the palatability enhancer consists essentially of animal fat.

Typically, the alkaline agent comprises sodium hydroxide. Optionally, the method further comprises determining the amount of free fatty acids in the animal fat source. Preferably, the alkaline agent is incorporated into the mixture in an amount that is about 95 wt % of the amount that is required for total neutralization of free fatty acids in the animal fat source.

Typically, in step a), the animal fat source is combined with one or more amino acids, sugars, vitamins and flavorants.

Optionally, the amino acid is selected from glycine, cysteine, alanine, methionine, proline, arginine, lysine, tyrosine, valine, glutamic acid, and aspartic acid. Preferably, the mixture comprises one or more amino acids in an amount of from 0.05 wt % to 5 wt %. More preferably, the one or more amino acids are in an amount of from 0.1 wt % to 0.3 wt %.

Optionally, the sugar is selected from dextrose, glucose, fructose, maltose, lactose, arabinose, xylose, ribose, mannose, erythrose, threose and galactose. Preferably, the mixture comprises one or more sugars in an amount of from 0.1 wt % to 4 wt %. More preferably, the one or more sugars are in an amount of from 0.5 wt % to 2 wt %.

Optionally, the flavorant is selected from a protein flavorant, a smoke flavorant, a yeast flavorant and a herb or herb extract flavorant. Preferably, the mixture comprises one or more flavorants in an amount of from 0.1 wt % to 4 wt %. More preferably, the one or more flavorants are in an amount of from 0.5 wt % to 2 wt %.

Optionally, the one or more flavor precursors are an intact protein or a hydrolysed protein. Preferably, the mixture comprises one or more flavor precursors in an amount of 0.5 wt % to 3 wt %. More preferably, the one or more flavor precursors are in an amount of 1 wt % to 2 wt %.

Optionally, the vitamin is selected from vitamin A, vitamin B1 (thiamine), vitamin B2 (riboflavin), vitamin B6 (Niacin), vitamin B12, (cyanocobalamin), pantothenic acid, biotin, vitamin C, vitamin D and vitamin E. Preferably, the mixture comprises one or more vitamins in an amount of from 0.01 wt % to 0.5 wt %. More preferably, the one or more vitamins are in an amount of from 0.05 wt % to 0.2 wt %.

Optionally, one or more vegetable oils may further be incorporated into the mixture in step a). Typically, the vegetable oil is selected from soybean oil, rapeseed oil, coconut oil, palm oil, peanut oil, corn oil, sunflower oil, safflower oil and cottonseed oil. Preferably, the mixture comprises one or more vegetable oils in an amount of from 0.5 wt % to 3 wt %. More preferably, the one or more vegetable oils are in an amount of from 1 wt % to 2.5 wt %.

Typically, the animal fat source comprises pork fat, chicken fat, lamb tallow or beef tallow. Preferably, the animal fat source comprises inedible animal fat. More preferably, the animal fat source consists essentially of inedible animal fat.

Optionally, step c) comprises isolating a fraction from the mixture, wherein the isolated fraction comprises animal fat in an amount of at least 80 wt %, and wherein the palatability enhancer comprises the isolated fraction.

Preferably, the palatability enhancer comprises the isolated fraction and one more further food ingredients. More preferably, the palatability enhancer consists essentially of the isolated fraction.

Typically, the fraction is isolated from the mixture by centrifugation. Optionally, during isolation of the fraction comprising the animal fat, the fraction is separated from an aqueous phase of the mixture which may comprises one or more fatty acids.

Preferably, the fraction comprising animal fat is isolated from the mixture at a temperature of 85° C. to 90° C. (185° F. to 194° F.). More preferably, the fraction comprising animal fat is isolated from the mixture at a temperature of 88° C. (~190° F.).

Optionally, the method is performed at a pressure of about 101 kPa. Further optionally, the mixture is heated to a temperature of about 98° C. (~208° F.) for at least 38 minutes. Still further optionally, the mixture is heated for 38 to 40 minutes.

Preferably, the animal fat source, the one or more edible agents, the alkaline agent, and water are combined at a temperature of from 20° C. to 45° C. (68° F. to 113° F.). More preferably, the animal fat source, the one or more edible agents, the alkaline agent, and water are combined at a temperature of 40° C. to 45° C. (104° F. to 113° F.).

Typically, one or more antioxidants are incorporated into the mixture, optionally, after heating the mixture. Optionally, the antioxidant is selected from BHA, BHT, propyl gallate, ethoxyquin, alpha tocopherol, beta tocopherol, gama tocopherol, delta tocopherol, rosemary extract, ascorbic acid (vitamin C), ascorbyl palmitate, citric acid, tea extract or mixtures thereof. Preferably, the mixture comprises one or more antioxidants in an amount of from 0.01 wt % to 0.5 wt %. More preferably, the one or more antioxidants are in an amount of from 0.1 wt % to 0.3 wt %.

Typically, one or more minerals are incorporated into the mixture, optionally, after heating the mixture. Preferably, the mineral is selected from calcium, phosphorus, sodium, potassium, magnesium, copper, zinc, iron, selenium, iodine, and iron.

In a second aspect, the present invention provides a food composition comprising at least one food ingredient, and a palatability enhancer obtained by the method as described herein. Preferably, the food composition comprises 1 to 10 wt % of the palatability enhancer.

In a third aspect, the present invention provides a method of enhancing the palatability of a food composition comprising:

a) combining an animal fat source, one or more edible agents, an alkaline agent and water at a temperature of up to 45° C. (113° F.) to form a mixture,
  wherein the edible agents are selected from amino acids, sugars, vitamins, flavorants and flavor precursors, and
  wherein said alkaline agent is present in an amount that does not exceed the amount required to neutralize fatty acids in the animal fat source;
b) heating the mixture to a temperature of 96° C. to 99° C. (~206° F. to 211° F.) for at least 35 minutes;
c) isolating a fraction from the mixture, wherein the fraction comprises animal fat in an amount of at least 80 wt %,
d) incorporating the fraction comprising the animal fat into the food composition to enhance the palatability of the food composition,
wherein the method is performed under ambient pressure.

Typically, the isolated fraction comprises animal fat in an amount of at least 90 wt %. Preferably, the isolated fraction consists essentially of animal fat.

Typically, the alkaline agent comprises sodium hydroxide. Optionally, the method further comprises determining the amount of free fatty acids in the animal fat source. Preferably, the alkaline agent is incorporated into the mixture in an amount that is about 95 wt % of the amount that is required for total neutralization of free fatty acids in the animal fat source.

Typically, in step a), the animal fat source is combined with one or more amino acids, sugars, vitamins and flavorants.

Optionally, the amino acid is selected from glycine, cysteine, alanine, methionine, proline, arginine, lysine, tyrosine, valine, glutamic acid, and aspartic acid. Preferably, the mixture comprises one or more amino acids in an amount of from 0.05 wt % to 5 wt %. More preferably, the one or more amino acids are in an amount of from 0.1 wt % to 0.3 wt %.

Optionally, the sugar is selected from dextrose, glucose, fructose, maltose, lactose, arabinose, xylose, ribose, mannose, erythrose, threose and galactose. Preferably, the mixture comprises one or more sugars in an amount of from 0.1 wt % to 4 wt %. More preferably, the one or more sugars are in an amount of from 0.5 wt % to 2 wt %.

Optionally, the flavorant is selected from a protein flavorant, a smoke flavorant, a yeast flavorant and an herb or herb extract flavorant. Preferably, the mixture comprises one or more flavorants in an amount of from 0.1 wt % to 4 wt %. More preferably, the one or more flavorants are in an amount of from 0.5 wt % to 2 wt %.

Optionally, the one or more flavor precursors is an intact protein or a hydrolysed protein. Preferably, the mixture comprises one or more flavor precursors in an amount of 0.5 wt % to 3 wt %. More preferably, the one or more flavor precursors are in an amount of 1 wt % to 2 wt %.

Optionally, the vitamin is selected from vitamin A, vitamin B1 (thiamine), vitamin B2 (riboflavin), vitamin B6 (Niacin), vitamin B12, (cyanocobalamin), pantothenic acid, biotin, vitamin C, vitamin D and vitamin E. Preferably, the mixture comprises one or more vitamins in an amount of from 0.01 wt % to 0.5 wt %. More preferably, the one or more vitamins are in an amount of from 0.05 wt % to 0.2 wt %.

Optionally, one or more vegetable oils may further be incorporated into the mixture in step a). Typically, the vegetable oil is selected from soybean oil, rapeseed oil, coconut oil, palm oil, peanut oil, corn oil, sunflower oil, safflower oil and cottonseed oil. Preferably, the mixture comprises one or more vegetable oils in an amount of from 0.5 wt % to 3 wt %. More preferably, the one or more vegetable oils are in an amount of from 1 wt % to 2.5 wt %.

Typically, the animal fat source comprises pork fat, chicken fat, lamb tallow or beef tallow. Preferably, the animal fat source comprises inedible animal fat. More preferably, the animal fat source consists essentially of inedible animal fat.

Typically, the isolated fraction is combined with one or more further food ingredients prior to incorporation into the food composition.

Typically, the fraction is isolated from the mixture by centrifugation. Optionally, during isolation of the fraction comprising the animal fat, the fraction is separated from an aqueous phase of the mixture which may comprises one or more fatty acids.

Preferably, the fraction comprising animal fat is isolated from the mixture at a temperature of 85° C. to 90° C. (185° F. to 194° F.). More preferably, the fraction comprising animal fat is isolated from the mixture at a temperature of 88° C. (~190° F.).

Optionally, the method is performed at a pressure of about 101 kPa. Further optionally, the mixture is heated to a temperature of about 98° C. (~208° F.) for at least 38 minutes. Still further optionally, the mixture is heated for 38 to 40 minutes.

Preferably, the animal fat source, the one or more edible agents, the alkaline agent, and water are combined at a temperature of from 20° C. to 45° C. (68° F. to 113° F.). More preferably, the animal fat source, the one or more edible agents, the alkaline agent, and water are combined at a temperature of 40° C. to 45° C. (104° F. to 113° F.).

Typically, one or more antioxidants are incorporated into the mixture, optionally, after heating the mixture. Optionally, the antioxidant is selected from BHA, BHT, propyl gallate, ethoxyquin, alpha tocopherol, beta tocopherol, gama tocopherol, delta tocopherol, rosemary extract, ascorbic acid (vitamin C), ascorbyl palmitate, citric acid, tea extract or mixtures thereof. Preferably, the mixture comprises one or more antioxidants in an amount of from 0.01 wt % to 0.5 wt %. More preferably, the one or more antioxidants are in an amount of from 0.1 wt % to 0.3 wt %.

Typically, one or more minerals are incorporated into the mixture, optionally, after heating the mixture. Preferably, the mineral is selected from calcium, phosphorus, sodium, potassium, magnesium, copper, zinc, iron, selenium, iodine, and iron.

In a fourth aspect, the present invention provides a food composition obtained by the method defined herein. Optionally, the food composition comprises the isolated fraction comprising animal fat in an amount of 1 to 10 wt %.

In a fifth aspect, the present invention provides a composition comprising: 75 wt % to 95 wt % animal fat, 0.1 wt % to 4 wt % sugars, 0.1 wt % to 4 wt % flavorants, 0.01 wt % to 0.5 wt % vitamins, 0.05 wt % to 0.5 wt % amino acids, and 5 wt % to 20 wt % water, wherein the animal fat comprises pork fat, the sugars comprise dextrose, the flavorants comprise a yeast flavorant and a smoky flavorant, the vitamins comprise thiamine, and the amino acids comprise glycine and alanine.

In a sixth aspect, the present invention provides a composition comprising: 75 wt % to 95 wt % animal fat, 0.1 wt % to 4 wt % sugars, 0.1 wt % to 4 wt % flavorants, 0.01 wt % to 0.5 wt % vitamins, 0.05 wt % to 0.5 wt % amino acids, and 5 wt % to 20 wt % water, wherein the animal fat comprises chicken fat, the sugars comprise dextrose, the flavorants comprise a yeast flavorant, the vitamins comprise thiamine, and the amino acids comprise methionine and cysteine.

In a seventh aspect, the present invention provides a method for reducing the odor of animal fat,
wherein the method comprises:
a) combining an animal fat source, one or more edible agents, an alkaline agent and water at a temperature of up to 45° C. (113° F.) so as to form a mixture, wherein the edible agents are selected from amino acids, sugars, vitamins, flavorants and flavor precursors, and
wherein said alkaline agent is present in an amount that does not exceed the amount required to neutralize fatty acids in the animal fat source;
b) heating the mixture to a temperature of 96° C. to 99° C. (206° F. to 211° F.) for at least 35 minutes;
c) isolating a reduced-odor fraction from the mixture, wherein the fraction comprises animal fat in an amount of at least 80 wt %,
wherein the method is performed under ambient pressure.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION

Figure 1A:
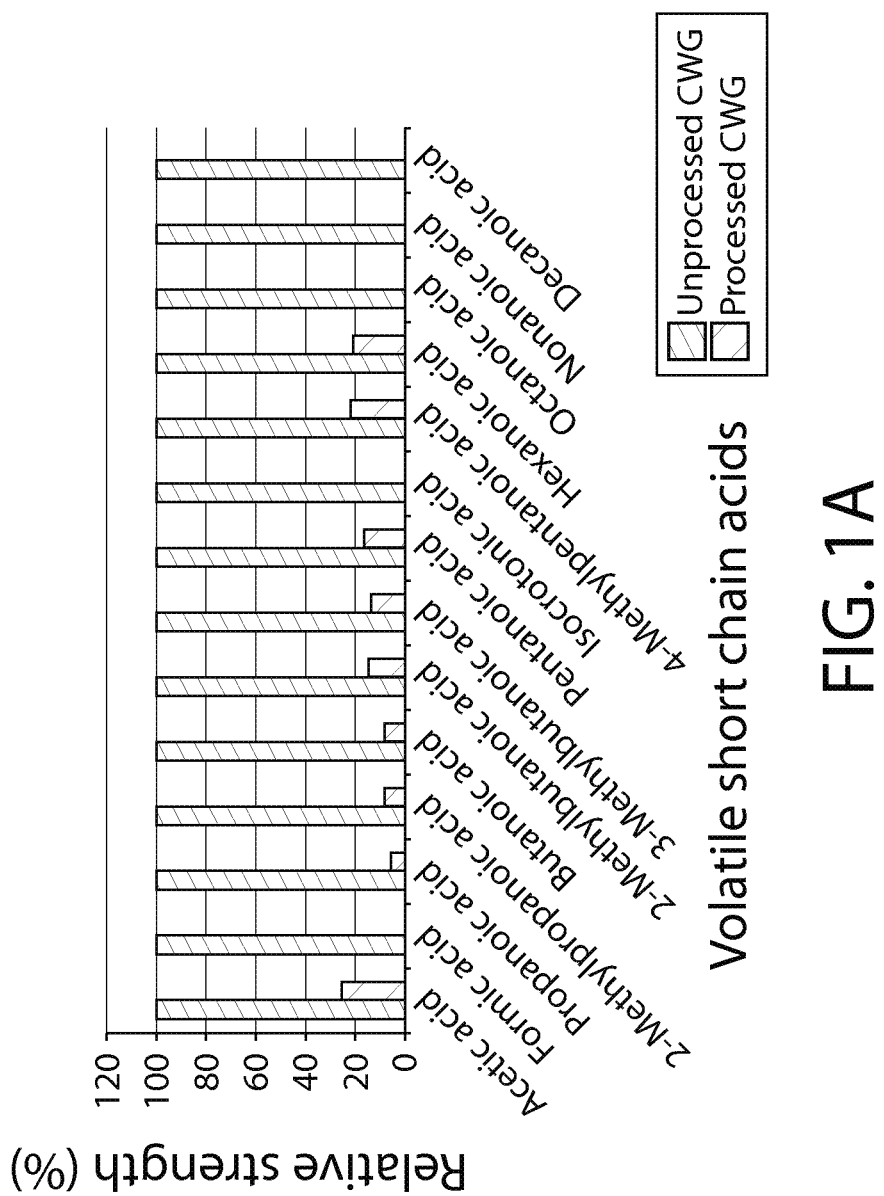
FIG. 1A is a bar chart illustrating the change in short fatty acid content in animal fat (Choice White Grease) prior to, and after, processing according to the present invention, as determined by GC-mass spectrometry using a solid phase micro-extraction method.

The following description of the preferred embodiment(s) is merely exemplary in nature and is in no way intended to limit the invention, its application, or uses.

As used throughout, ranges are used as shorthand for describing each and every value that is within the range. Any value within the range can be selected as the terminus of the range.

In addition, all references cited herein are hereby incorporated by referenced in their entireties. In the event of a conflict in a definition in the present disclosure and that of a cited reference, the present disclosure controls.

Unless otherwise specified, all percentages and amounts expressed herein and elsewhere in the specification should be understood to refer to percentages by weight. The amounts given are based on the active weight of the material.

As referred to herein, all pressure values correspond to absolute pressure values.

As used herein, the term "food" may refer not only to a food product which typically provides most, if not all, the nutrient value for an animal, but may also refer to such items as a snack, treat, and supplement.

In some embodiments, the present invention provides a method of preparing a palatability enhancer for a food composition, wherein the method comprises:
a) combining an animal fat source, one or more edible agents, an alkaline agent and water at a temperature of up to 45° C. (113° F.) so as to form a mixture,
wherein the edible agents are selected from amino acids, sugars, vitamins, flavorants and flavor precursors, and
wherein the alkaline agent is present in an amount that does not exceed the amount required to neutralize fatty acids in the animal fat source;
b) heating the mixture to a temperature of 96° C. to 99° C. (~206° F. to 211° F.) for at least 35 minutes;
c) obtaining a palatability enhancer from the mixture;
wherein the method is conducted under ambient pressure, and
wherein the palatability enhancer comprises animal fat in an amount of at least 80 wt %.

Step c) may comprise isolating a fraction from the mixture, wherein the isolated fraction comprises animal fat in an amount of at least 80 wt %. The palatability enhancer may comprise or consist of the isolated fraction. In one arrangement, the palatability enhancer comprises the isolated fraction and one or more food ingredients as defined herein.

In other embodiments, the present invention provides a method of enhancing the palatability of a food composition comprising:
a) combining an animal fat source, one or more edible agents, an alkaline agent and water at a temperature of up to 45° C. (113° F.) so as to form a mixture,
wherein the edible agents are selected from amino acids, sugars, vitamins, flavorants and flavor precursors, and
wherein said alkaline agent is present in an amount that does not exceed the amount required to neutralize fatty acids in the animal fat source;
b) heating the mixture to a temperature of 96° C. to 99° C. (~206° F. to 211° F.) for at least 35 minutes;
c) isolating a fraction from the mixture, wherein the fraction comprises animal fat in an amount of at least 80 wt %; and
d) incorporating the fraction comprising the animal fat into the food composition to enhance the palatability of the food composition;
wherein the method is performed under ambient pressure.

In yet other embodiments, the present invention provides a method for reducing the odor of animal fat, wherein the method comprises:
a) combining an animal fat source, one or more edible agents, an alkaline agent and water at a temperature of up to 45° C. (113° F.) so as to form a mixture,
wherein the edible agents are selected from amino acids, sugars, vitamins, flavorants and flavor precursors, and
wherein said alkaline agent is present in an amount that does not exceed the amount required to neutralize fatty acids in the animal fat source;
b) heating the mixture to a temperature of 96° C. to 99° C. (~206° F. to 211° F.) for at least 35 minutes; and
c) isolating a reduced-odor fraction from the mixture, wherein the fraction comprises animal fat in an amount of at least 80 wt %, and wherein the method is performed under ambient pressure.

By "reduced-odor fraction" it is meant that the odor of the fraction is more desirable or pleasant to a human and/or a consuming animal than the odor of the unprocessed fat.

The animal fat source of the present invention may comprise fabricated meat (which includes fat, bones, and other animal parts) or offal from slaughtering (which includes viscera, intestines, fats, tendons and carcasses), originating, without limitation, from cattle, poultry, horses, sheep, and pigs.

Typically, animal fat is rendered and filtered from the above raw materials by methods known to the person skilled in the art before use in the methods of the present invention. In the rendering process, fabricated meat and/or offal may be finely chopped or ground, and heated to a temperature of 80° C. to 130° C. (176° F. to 266° F.), with or without added steam, to denature the protein. After heating, the fat, usually in liquid form, is separated from the solid material (meal), optionally by centrifugation. Typically, the fat is subjected to further centrifugation at high temperatures (for example, from 80° C. to 100° C. (176° F. to 212° F.)) in order to remove fines and moisture. After centrifugation, the fat may be used in the methods of the present invention. Alternatively, the animal fat source may be used in the methods of the present invention without any treatment.

In one arrangement, the animal fat source for use in the present invention comprises pork fat, chicken fat, poultry fat, lamb tallow or beef tallow, or a combination thereof. One example of pork fat that may be used in Choice White Grease. Other animal fat sources that may be used include goose fat and duck fat.

Preferably, the animal fat source comprises inedible fat. More preferably, the animal fat source consists essentially of inedible fat. The term 'inedible fat' as used herein denotes fats or tallows that have been extracted and separated by rendering some or all of inedible animal parts including offal, bones, trims from meat fabrication, hides, skins, blood, and carcass.

Typically, the animal fat source, and in particular, the inedible animal fat is in liquid form at room temperature (for example, 20° C. to 25° C. (68° F. to 77° F.)).

The animal fat source or animal fat may be combined with one or more edible agents, alkaline agent and water to form a mixture, in an amount of from 75 wt % to 95 wt % by total weight of the mixture. Optionally, the animal fat source or animal fat is present in the mixture in an amount of from 80 wt % to 90 wt % by total weight of the mixture. Preferably, the animal fat source or animal fat is present in the mixture in an amount of from 80 wt % to 85 wt % or from 85 wt % to 90 wt % by total weight of the mixture. In one embodiment, the mixture comprises from 87 wt % to 90 wt % of the animal fat source or animal fat by total weight of the mixture. Accordingly, the one or more edible agents, alkaline agent and water may be present in the mixture in a total amount of 5 wt % to 25 wt % by total weight of the mixture. Preferably, the one or more edible agents, alkaline agent and water are present in the mixture in a total amount of 10 wt % to 20 wt % by total weight of the mixture.

The present inventors have found that when the proportion of animal fat in the mixture is as defined above, the reaction between the edible agents, alkaline agents and fat is optimal, and the removal of odor-promoting compounds such as fatty acids is maximized. Furthermore, when the proportion of animal fat in the mixture is as defined above, residual protein is effectively withdrawn from the fat, resulting in a more "pure" fat preparation.

In step a), the animal fat source, or animal fat, is combined with one or more one or more edible agents, alkaline agent and water to form a mixture, wherein the agents are selected from amino acids, sugars, vitamins, flavorants and flavor precursors. The final aroma and perception of the processed fat (e.g. sweet, meaty, smoky, or buttery aromas) will depend both on the specific combination of edible agents selected and on the type of fat used. By choosing different combinations of edible agents, many different aromas and flavor can be created.

Cats and dogs have different aroma preferences. In general, dogs like sweet, meaty and smoked aromas like those of cooked bacon, or cheesy, creamy, and buttery aromas like those of cheese or ice cream. On the other hand, cats generally prefer bland, meaty, and fatty aromas like those of broiled chicken or roasted turkey. Therefore, the choice of animal fat source and edible agents for imparting flavor may be specifically tailored for these preferences. A person skilled in the art of pet food manufacture would be aware of such animal preferences and therefore, they would be able to select appropriate fat sources and edible agents.

In one arrangement, solid ingredients which may include sugars, amino acids, flavorants and vitamins, are blended with water to form an aqueous precursor solution. Animal fat is then incorporated into the aqueous precursor solution to form an aqueous mixture. Optionally, the mixture is agitated to ensure all the ingredients become dissolved and are thoroughly mixed.

Water may be provided in the mixture in an amount of up to 25 wt %, or up to 20 wt %, or up to 15 wt % or up to 10 wt %, by total weight of the mixture. Optionally, the amount of water present in the mixture is from 5 wt % to 20 wt %, or from 5 wt % to 15 wt %, or from 10 wt % to 15 wt % by total weight of the mixture. Preferably, the amount of water in the mixture is from 12 wt % to 15 wt % by total weight of the mixture. The water in the mixture not only effectively dissolves the solid ingredients for dispersion, but also increases reaction efficacy by promoting close contact between the reactants. Furthermore, the water may assist subsequent phase separation during isolation step by trapping undesirable water-soluble materials (see 'isolation step' below).

Any amino acid may be incorporated into the mixture. Amino acids may include without limitation, asparagine, glutamine, histidine, isoleucine, leucine, lysine, methionine, phenylalanine, threonine, tryptophan, alanine, arginine, aspartic acid cysteine, glutamic acid, glutamine, glycine, tyrosine, proline, valine and serine. In one arrangement, the amino acid is selected from glycine, cysteine, alanine, methionine, proline, arginine, lysine, tyrosine, valine, glutamic acid, and acid.

In one arrangement, one or more amino acids are incorporated into the mixture in an amount of from 0.05 wt % to 2 wt % by total weight of the mixture. Optionally, one or more amino acids are incorporated into the mixture in an amount of from 0.05 wt % to 1 wt % by total weight of the mixture. Further optionally one or more amino acids are incorporated into the mixture in an amount of from 0.1 wt % to 1 wt % by total weight of the mixture. Preferably, one or more amino acids are incorporated into the mixture in an amount of from 0.1 wt % to 0.4 wt %, or from 0.1 wt % to 0.3 wt %, or from 0.1 wt % to 0.2 wt % by total weight of the mixture. In other embodiments, one or more amino acids are incorporated into the mixture in an amount of from 0.05 wt % to 0.4 wt %, or from 0.05 wt % to 0.3 wt %, or from 0.05 wt % to 0.2 wt % by total weight of the mixture.

Any sugar may be incorporated into the mixture. Sugars include, without limitation, dextrose, glucose, fructose, maltose, lactose, arabinose, xylose, ribose, mannose, erythrose, threose and galactose. Preferably, the sugar is selected from dextrose, xylose, or fructose.

In one arrangement, one or more sugars are incorporated into the mixture in an amount of 0.1 wt % to 4 wt % by total weight of the mixture. Optionally, one or more sugars are incorporated into the mixture in an amount of from 0.5 wt % to 3 wt % by total weight of the mixture. Further optionally, one or more sugars are incorporated into the mixture in an amount of from 0.5 wt % to 2 wt %, or from 0.5 wt % to 1.5 wt % or from 0.5 wt % to 1 wt % by total weight of the mixture. In other embodiments, one or more sugars are incorporated into the mixture in an amount of from 1 wt % to 2 wt %, or from 1 wt % to 1.5 wt % by total weight of the mixture.

Any flavorant may be incorporated into the mixture. Flavorants include, without limitation, protein flavorants, smoke flavorants, yeast flavorants and herb or herb extract flavorants. Preferably, charbroil mesquite (a liquid smoke flavorant) is incorporated into the mixture. One example of a yeast flavorant is the commercially available Provesta 032. The person skilled in the art would be aware of other flavorants that may be used. Sources of protein flavorants include intact tissue or hydrolyzed pork, chicken, poultry, lamb, goat, deer, venison, yeast, and mushroom. Sources of a herb and/or herb extract flavorant garlic, onion, basil, saffron and rosemary.

In one arrangement, one or more flavorants are incorporated into the mixture in an amount of 0.05 wt % to 3 wt % by total weight of the mixture. Optionally, one or more flavorants are incorporated into the mixture in an amount of from 0.1 wt % to 2 wt % or from 0.5 wt % to 1 wt % by total weight of the mixture. Further optionally one or more flavorants are incorporated into the mixture in an amount of from 1 wt % or 1.5 wt % to 2 wt % or 2.5 wt % by total weight of the mixture. Preferably, one or more flavorants are incorporated into the mixture in an amount of from 0.5 wt % to 2 wt %, or from 0.5 wt % to 1.5 wt % by total weight of the mixture.

Typically, the flavor precursor is selected from an intact animal or vegetable protein, or a hydrolysed animal or vegetable protein. Optionally, one or more flavor precursors are incorporated into the mixture in an amount of from 0.05 to 3 wt %, or from 0.1 wt % to 3 wt %, or from 0.5 wt % to 3 wt % by total weight of the mixture. Preferably, the one or more flavor precursors are incorporated into the mixture from in an amount from 1 wt % to 1.5 wt % or 2 wt % by total weight of the mixture.

In some embodiments, one or more vegetable oils are incorporated into the mixture, preferably prior to heating, in step a). Vegetable oils include, without limitation, soybean oil, rapeseed oil, coconut oil, palm oil, peanut oil, corn oil, sunflower oil, safflower oil and cottonseed oil.

In one arrangement, one or more vegetable oils are incorporated in the mixture in an amount of 0.1 wt % to 3 wt % or from 0.5 wt % to 3 wt % by total weight of the mixture. Optionally, the one or more vegetable oils are incorporated into the mixture in an amount of from 1 wt % to 2.5 wt %. Further optionally the one or more vegetable oils are incorporated into the mixture in an amount of from 1.5 wt % to 2.5 wt %, or from 1.5 wt % to 2 wt %.

Incorporation of at least one vegetable oil is technically advantageous as it increases the fluidity of the treated animal fat that is obtained after isolation resulting in a treated animal fat that is more pourable, and consequently, easier to handle.

Any vitamin may be incorporated into the mixture. Vitamins include, without limitation, vitamin A, vitamin B1 (thiamine), vitamin B2 (riboflavin), vitamin B6, vitamin B12, (cyanocobalamin), pantothenic acid, biotin, vitamin C, vitamin D and vitamin E. In one arrangement, thiamine hydrochloride is incorporated into the mixture. In another arrangement, a vitamin mixture comprising two or more vitamins is incorporated in the mixture.

In one arrangement, one or more vitamins are incorporated into the mixture in an amount of 0.01 wt % to 0.5 wt % by total weight of the mixture. Optionally, one or more vitamins are incorporated into the mixture in an amount of from 0.05 wt % to 0.3 wt % or from 0.05 wt % to 0.2 wt % by total weight of the mixture. Further optionally, one or more vitamins are incorporated into the mixture in an amount of from 0.05 wt %, or 0.1 wt %, or 0.2 wt %, to 0.25 wt %, or 0.3 wt %, or 0.4 wt % by total weight of the mixture. Preferably one or more vitamins are incorporated into the mixture in an amount of from 0.01 wt % or 0.05 wt % to 0.1 wt % by total weight of the mixture.

A typical aqueous mixture comprising animal fat and edible agents for processing according to the present invention is illustrated in Table 1.

TABLE 1

A typical mixture comprising animal fat and edible agents

| Ingredient | Amount (wt % by total weight of the mixture) |
|---|---|
| Animal fat | 75-95 |
| Sugars | 0.1-4 |
| Flavorants | 0.1-4 |
| Vitamins | 0.01-0.5 |
| Amino acids | 0.05-0.5 |
| Water | 5-20 |

In one embodiment, the animal fat comprises pork fat such as Choice White Grease, the sugars comprise dextrose, the flavorants comprise a yeast flavorant and a smoky flavorant, the vitamins comprise thiamine, and the amino acids comprise glycine and alanine. An animal fat processed using this formula would typically be suitable for canine consumption.

In another embodiment, the animal fat comprises chicken fat, the sugars comprise dextrose, the flavorants comprise a yeast flavorant, the vitamins comprise thiamine, and the amino acids comprise methionine and cysteine. An animal fat processed using this formula would typically be suitable for canine consumption.

In a preferred arrangement, the composition of Table 1 may comprise: 80 wt % to 90 wt % animal fat, 0.5 wt % to 2 wt % sugars, 0.5 wt % to 2 wt % flavorants, 0.05 wt % to 0.2 wt % vitamins, 0.1 wt % to 0.3 wt % amino acids, and 5 wt % to 15 wt % water, by total weight of the composition.

In one arrangement of the methods of the present invention, an alkaline agent is combined with the edible agents, animal fat or animal fat source, and water. Preferably, the alkaline agent is an alkali metal hydroxide such as sodium hydroxide, potassium hydroxide or calcium hydroxide. In other embodiments, the alkaline agent may be a metal carbonate such as sodium carbonate or potassium carbonate. Most preferably, the alkaline agent is sodium hydroxide. The present inventors have found that sodium hydroxide is more effective than other alkaline agents in reducing the odor of animal fat in the methods of the present invention. Furthermore, sodium hydroxide is easier to incorporate into the aqueous mixture due to its liquid form, thus avoiding any steps of dissolution or hydration that would be required for a solid alkaline agent.

Typically, the alkaline agent is incorporated into the mixture in an amount that does not exceed the amount required to neutralize free fatty acids in the animal fat or animal fat source. If the amount of alkaline agent that is used is greater than the amount required to neutralize free fatty acids in the animal fat or animal fat source, then saponification of the fat occurs, particularly under the high temperature conditions of the present methods, resulting in an undesirable 'soapy' odor. Preferably, the amount of alkaline agent that is combined with the animal fat or animal fat source, edible agents and water, is 1 to 10 wt % or 1 to 5 wt % less than that required for complete neutralization of fatty acids. (i.e. the amount of alkaline agent used is 90 to 99 wt % or 95 to 99 wt % of the amount required for complete neutralization.) More preferably, the amount of alkaline agent that is combined with the animal fat, edible agents and water is 3 to 5 wt % less than that required for complete neutralization of fatty acids. Most preferably, the amount of alkaline agent that is combined with the animal fat, edible agents and water is about 5 wt % less than that required for complete neutralization of fatty acids. (i.e. the amount of alkaline agent used is preferably 95 to 97 wt %, or most preferably 95 wt %, of the amount required for complete neutralization.)

The advantage of using an amount of alkaline agent that is less than that required to achieve complete neutralization of fatty acids is that even if the total amount of free fatty acids is overestimated (see below), saponification of the animal fat will not occur, and undesirable "soapy" aromas will not be generated. Any fatty acids which have not been neutralized in step b) are typically retained in an aqueous phase of the mixture and may be separated from the fat using the fat isolation procedures described herein.

Thus, in one arrangement, the methods of the present invention further comprise determining the amount of free fatty acids (typically as a percentage weight) in the animal fat or animal fat source. Methods of determining the amount of free fatty acids would be known to a person skilled in the art of food chemistry. In a preferred embodiment, the quantity of free fatty acids is determined using a titration method according to American Oil Chemists' Society (AOCS) Ca5a-40, which is incorporated herein by reference. Briefly, a sample of animal fat of known weight (typically 5 grams) is melted to form a liquid and mixed with 50 ml of ethyl alcohol (95%) and 1 ml of 1% phenolphthalein indicator solution. The mixture is then titrated with 0.1N NaOH with agitation until a permanent color change (to pink) occurs. The percentage of free fatty acids in most types of fats is calculated as oleic acid, using the formula:

$$\text{Free fatty acids as oleic}(wt\%) = \frac{\text{Amount of NaOH(ml)} \times \text{normality of NaOH} \times 28.2}{\text{Weight of fat sample(g)}}$$

Typically, samples of animal fat are collected from different depths of a fat stock, and the titration is conducted on each sample to obtain an average value for the amount of free fatty acids. Once the amount of free fatty acids has been determined, an appropriate quantity of alkaline agent may be selected such that it does not exceed the amount required to neutralize free fatty acids. For example, if the amount of sodium hydroxide is to be used at a 5% deficit with respect to the amount that would be required for total neutralization of fatty acids (such that the amount of NaOH is 95% of that required for total neutralization), then the amount of sodium hydroxide to be used may be determined by the following equation:

$$\text{Amount of NaOH}(\%) = \frac{\text{Amount of } FFA \text{ in fat}(\%) \times \text{Amount of fat in aqueous mixture}(\%)}{180(Mw \text{ of oleic acid}) \times 10000} \times 40(Mw \text{ of NaOH}) \times 95$$

In some instances, rendered animal fats may be brown or light brown in color. The color of the animal fat may further depend on its source. When using the AOCS Ca5a-40 titration method, an inherent brown color may make it difficult to establish precisely the end-point of the titration (i.e. when a light pink color develops), and the amount of fatty acids may be overestimated. Therefore, in one embodiment of the invention, it is preferable to use an amount of alkaline agent that is less than the amount required for total neutralization of the determined amount of free fatty acids in the animal fat, to avoid the risk of having any excess of alkaline agent, and to avoid ensuing saponification.

The animal fat or animal fat source, the edible agents, the alkaline agent and water are preferably combined at a temperature of up to 45° C. (113° F.), or at a temperature of from 10° C. to 45° C. (50° F. to 113° F.), or from 20° C. to 45° C. (68° F. to 113° F.) or from 30° C. to 45° C. (80° F. to 113° F.) or from 40° C. to 45° C. (104° F. to 113° F.). In other embodiments, the animal fat or animal fat source, the edible agents, the alkaline agents and water are combined at a temperature of from 25° C. to 45° C. (77° F. to 113° F.) or from 30° C. to 40° C. (80° F. to 104° F.). The present inventors have found that above 45° C. (113° F.), there is increased saponification of the fat, resulting in undesirable 'soapy' odors. Once the animal fat source, the edible agents, the alkaline agents and water have been combined, mixing may take place whilst maintaining the above temperatures over a period of up to 5, 10 or 15 minutes. An agitator is typically used for mixing.

In one arrangement, the mixture obtained from combining an animal fat source with one or more of the agents as defined above is heated to a temperature of 96° C. to 99° C. (~206° F. to 211° F.) for at least 35 minutes, at least 36 minutes, at least 37 minutes, at least 38 minutes, at least 39 minutes or at least 40 minutes. In one embodiment, the heating time is from 35 to 40 minutes or from 38 to 40 minutes. Preferably, the mixture is heated to a temperature of about 98° C. for 38 to 40 minutes, or for 38 minutes. During the heating process, the high temperature promotes reactions such as the Maillard reaction for flavor creation. Additionally, the high temperature promotes the lethal deactivation of virus particles and other microorganisms (for example, *Salmonella, E. coli, Listeria, Enterobacter*). A minimum heating time of 35 minutes is required to ensure that the fat obtained from the process complies with international microbiological safety standards. The presence of water in the mixture also promotes sanitization. Heating fat alone, in the absence of water, is not effective for sanitization because the fat may encapsulate contaminating microorganisms, thereby insulating them and rendering them resistant to heat inactivation. Water promotes heat contact and penetration of microorganisms. A vortex agitation further ensures a thorough mixing of material and promotes contact between the agents for enhanced flavor reactions.

The temperature of heating should not exceed 99° C. (~211° C.). Above this temperature, boiling of water occurs and the temperature cannot be maintained without the use of a pressurized vessel.

The methods of the present invention are typically conducted under ambient pressure. "Ambient pressure" refers to the normal surrounding atmospheric pressure. Generally, the ambient pressure will be about 101 kPa. However, the pressure may vary from 100 kPa to 103 kPa. Thus, the methods of the present invention do not need to be carried out in a pressurized vessel, allowing the methods to be performed economically on a large scale. The present inventors have unexpectedly found that flavor development and microbial cleansing occurs effectively without the application of supra-atmospheric pressures.

Animal fats, and particularly, inedible animal fats, usually have strong, undesirable odors. The odors may be attributed to a wide range of compounds or molecules including skatols, indoles, p-cresols, thiols, and biogenic amines, and in particular, to short chain and branched chain fatty acids. Fatty acids may include, for example, propionic acid, butyric acid, pentanoic acid and hexanoic acid). These compounds and molecules may originate from microbial fermentation and biological decomposition of the animal meats or parts before being rendered into fat.

The present inventors have found that when an animal fat source, and particularly an animal fat source comprising or consisting of inedible fat, is heated at high temperatures under the conditions defined above, chemical reactions occur which change the flavor characteristics of the animal fat and reduce the odor of the animal fat. Chemical reactions include, but are not limited to, neutralization reactions, Maillard reactions, and aroma partition from the flavorants. Accordingly, the methods described herein may further comprise reducing the odor of animal fat.

After heating the animal fat as described herein, the mixture may optionally be cooled prior to isolating a fraction comprising animal fat from the mixture, and/or obtaining the palatability enhancer. Preferably, the mixture is cooled to a temperature of from 50° C. to 90° C. (122° F. to 194° F.), or from 60° C. to 90° C. (140° F. to 194° F.), or from 65° C. to 80° C. (149° F. to 176° F.), or from 65° C. to 75° C. (149° F. to 167° F.), or from 65° C. to 70° C. (149° F. to 158° F.). More preferably, the mixture is cooled to a temperature of from 80° C. to 90° C. (176° F. to 195° F.). The isolation step may subsequently be performed at these relatively high temperatures to allow an effective removal of water from the fat.

One or more antioxidants may be incorporated into the mixture, typically after heating the mixture. Antioxidants include, without limitation. BHA, BHT, propyl gallate, exothyquin, alpha tocopherol, beta tocopherol, gama tocopherol, delta tocopherol, rosemary extract, ascorbic acid (or vitamin C), ascorbyl palmitate, citric acid and tea extract. Preferably, the antioxidant comprises rosemary extract, tea extract, tocopherols, ascorbic acid and ascorbyl palmitate. Antioxidant mixtures comprising at least two antioxidants may also be used.

Preferably, the one or more antioxidants are incorporated into the mixture after cooling. In an alternative arrangement, the one or more antioxidants may be incorporated into the mixture during cooling. In yet another alternative arrangement, the one or more antioxidants may be incorporated into the mixture during step a) and prior to heating when the animal fat source is combined with one or more agents as defined herein. Preferably, the one or more antioxidants are incorporated into the mixture prior to isolating the fraction and/or obtaining the palatability enhancer.

In one arrangement, the one or more antioxidants are incorporated into the mixture in an amount of 0.005 wt % to 0.5 wt %. Optionally, the one or more antioxidants are incorporated into the mixture in an amount of from 0.01 wt % to 0.4 wt %. Preferably, the one or more antioxidants are incorporated into the mixture in an amount of from 0.01 wt % to 0.3 wt %, or from 0.05 wt % to 0.2 wt %, or from 0.1 wt % to 0.2 wt % by total weight of the mixture.

The palatability enhancer may be obtained from the mixture. In one arrangement, a fraction comprising the animal fat is isolated from the mixture. The palatability enhancer may comprise or consist of the isolated fraction. In one arrangement, the palatability enhancer comprises the isolated fraction and one or more food ingredients as defined herein.

Preferably, the isolated fraction comprises at least 80 wt % or at least 90 wt % animal fat. More preferably, the isolated fraction consists essentially of animal fat. Typically, the fraction has a reduced odor relative to the animal fat source or animal fat that is combined with the agents defined herein. Optionally, the fraction is isolated by centrifugation. Alternatively, the fraction is isolated by gravity separation such as settling or precipitating.

Typically in the isolation process, the mixture is transferred to another vessel and centrifuged. Appropriate speeds and duration of centrifugation would be known to the person skilled in the art, but may range from 1000 rpm to 3000 rpm, for 30 seconds to 2 minutes. The centrifugation step is preferably performed at a temperature of from 50° C. to 90° C. (122° F. to 194° F.), from 60° C. to 90° C. (140° F. to 194° F.), from 65° C. to 80° C. (149° F. to 176° F.), from 65° C. to 75° C. (149° F. to 167° F.), or from 65° C. to 70° C. (149° F. to 158° F.). More preferably, the centrifugation step is carried out at a temperature of from 80° C. to 90° C. (176° F. to 195° F.). The present inventors have found that when centrifugation is performed at these relatively high temperatures, moisture removal from the processed fat is maximized, thereby minimizing potential microbial pockets.

During isolation, particularly by centrifugation, the fraction comprising the animal fat may be visible as a lipid layer (light phase) on top of an aqueous layer (heavy phase). Centrifuging also traps residual dry solids such as proteins, pigments, bone chips etc. which are present in the raw material, in the heavy phase. This further polishes and brightens the color of the processed fat. In one arrangement, preferably after centrifugation, the fraction comprising the animal fat is separated from the aqueous phase by siphoning off the aqueous phase. Other methods of separation would be known to the person skilled in the art. Any separation method that enables isolation of a fraction comprising the animal fat from the remainder of the mixture, and in particular, from the aqueous phase of the mixture, is suitable.

The isolation of the animal fat, and moreover, the removal of the aqueous phase, enables the removal of water-soluble odorous compounds such as fatty acids, and in particular, branched chain fatty acids from the fat. Other undesirable water-soluble materials and precipitates may also be removed from the fat during the isolation process, including the odorous compounds and molecules defined above.

The present inventors have unexpectedly found that the fraction comprising animal fat isolated according to the methods of the present invention enhances the palatability of food compositions. Thus, in one embodiment, a palatability enhancer is obtained from the isolated fraction comprising the animal fat.

Typically, the isolated fraction comprising the animal fat is in a liquid or paste form at room temperature (which is typically from 20° C. to 25° C. (68° F. to 77° F.)). Preferably, the isolated fraction comprises animal fat in an amount of at least 80 wt %, or at least 90 wt %. More preferably, the isolated fraction consists essentially of animal fat. Optionally, the isolated fraction may be used without any further processing as a palatability enhancer. Therefore, the isolated fraction comprising the animal fat may be added directly to a food composition.

Accordingly, the palatability enhancer obtained by the methods of the present invention may comprise animal fat in an amount of at least 80 wt %, or at least 90 wt %. Preferably, the palatability enhancer obtained by the methods of the present invention consists essentially of animal fat. Optionally, the isolated fraction comprising the animal fat is packaged for later use. Alternatively, the isolated fraction may be combined with one or more food ingredients as defined herein prior to its incorporation into a food composition.

The present invention further provides a food composition comprising at least one food ingredient, and a palatability enhancer obtained by the methods described herein.

The at least one food ingredient may be selected from protein (for example, meat, meat-by products, dairy products, eggs, wheat protein, soy protein and potato concentrate), fat (for example, animal fat, fish oil, vegetable oil, meat and meat by-products), and carbohydrate (for example, grains such as wheat, corn, barley and rice). Other food ingredients include, without limitation, fiber (for example cellulose, beet pulp, peanut hulls and soy fiber), vitamins, minerals and preservatives. The food ingredient may be any food ingredient defined herein.

In one embodiment, the isolated fraction comprising animal fat or the palatability enhancer obtained by the methods of the methods of the present invention, may replace the entire fat content of an animal food formula. The present inventors have unexpectedly found that animal fat prepared according to the methods of the present invention are highly palatable, and may be used in larger quantities than fat refined by other methods.

The food composition of the present invention may be suitable for consumption by any animal. Animals include human and non-human animals. Non-human animals include, without limitation, avians, bovines, canines, equines, felines, murines, ovines, and porcines.

Preferably, the food composition is for consumption by a canine or a feline.

Food compositions of the present invention can be prepared in a dry or wet form using conventional processes.

In one embodiment of preparing a dry food composition, dry ingredients, including animal protein sources, plant protein sources, and grains ground and mixed together. Moist or liquid ingredients, including fats, oils, animal protein sources, and water, are then added to and blended with the dry mix. The resulting mixture may then be processed into kibbles or similar dry food pieces using extrusion and cutting processes known to the person skilled in the art.

The isolated fraction obtained by the methods of the present invention may be added to the food composition during its normal preparation procedure such as mixing, extrusion, and baking. Preferably, it is added after the food composition has been prepared (for example, post extrusion), such as by spraying or coating the surface of the food. This is particularly desirable for dry foods wherein extruded strands of food may be contacted with the fraction comprising the animal fat by spraying or coating the extruded strands before the strands are cut into kibbles or pieces. Alternatively, the kibbles or pieces themselves may be contacted with the fraction comprising the animal fat by spraying, coating or dipping the kibbles or pieces per se.

In one embodiment of preparing a wet food composition, ground animal (e.g., mammal, poultry, fish and/or seafood) proteinaceous tissues are mixed with one or more other food ingredients, including fish oils, cereal grains, and special purpose additives (e.g., vitamin and mineral mixtures, inorganic salts, cellulose and beet pulp, and bulking agents). Water sufficient for processing may also be added. The wet ingredients are typically mixed and heated to form a thick liquid, prior to canning and sterilization.

For wet foods, the fraction comprising the animal fat can be incorporated into the wet food composition prior to heating and cooking. Alternatively, the fraction comprising the animal fat can be mixed into the dry materials prior to forming the wet food composition.

The food composition of the present invention, when used for non-human animal consumption, may also be in the form of treats or toys. Treats of the present invention can be prepared by extrusion or baking processes that would be apparent to the person skilled in the art. The fraction comprising the animal fat may be used to either coat the exterior of existing treat forms, or it may be injected into an existing treat form. Non-human animal toys of the present invention are typically prepared by coating any existing toy with a fraction comprising the treated animal fat.

Advantageously, animal fat processed according to the present invention may be incorporated into food compositions or may be used to coat dry food compositions (e.g. kibbles) in amounts as high as 15 wt % of the food composition, without having any negative impact on palatability. Thus, in some embodiments, animal fat according to the present invention replaces any additional exogenous fat that would otherwise be incorporated into a food composition (e.g. through external coating). In other embodiments, animal fat processed according to the present invention may be incorporated into food compositions or may be used to coat dry food compositions in an amount of up to 5 wt %, or up to 10 wt %, or up to 15 wt %. Accordingly, in one arrangement, the present invention provides a food composition comprising animal fat processed according to the present invention in an amount of 1 to 15 wt %, or from 5 to 15 wt % by total weight of the composition. In another arrangement, the present invention provides a food composition comprising animal fat processed according to the present invention in an amount of from 1 to 10 wt %, or from 5 to 10 wt % or from 7 to 10 wt % by total weight of the composition.

The invention is further illustrated in the following non-limiting Examples.

EXAMPLES

Example 1

Processing of Animal Fat

A pork fat (Choice White Grease)-based mixture according to Table 2 was processed by the method described herein to obtain processed fat suitable for canine consumption (referred to hereinafter as "BBQ fat"), and a premium chicken-fat based mixture according to Table 3 was processed by the method described herein to obtain processed fat suitable for feline consumption (referred to hereinafter as "Roasted Chicken Fat"). In the composition of Table 2 for dogs, the edible agents (in particular, yeast extract, alanine, glycine, thiamine and smoke flavor) were specifically selected to mimic bacon flavor. In the composition of Table 3 for cats, the edible agents (in particular, dextrose, yeast extract, methionine, cysteine and thiamine) were specifically selected to mimic the aroma profile of broiled chicken.

TABLE 2 pork fat mixture for dogs

| Ingredient | Amount (wt % by total weight of mixture) |
|---|---|
| Choice White Grease | 87-90 |
| Water | 10-12 |
| Yeast flavorant | 0.5-0.8 |
| Smoke flavorant | 0.05-0.2 |
| Amino acids (including glycine and alanine) | 0.1-0.3 |
| Sugars | 0.1-0.2 |
| Vitamins (including thiamine) | 0.05 to 0.1 |
| NaOH* | 0.2 |

*Using the AOCS Ca 5a-40 titration method described herein, it was determined that the Choice White Grease contained free fatty acids in an amount of 1.1 wt %. The amount of NaOH to be added was calculated accordingly using the formula described above, wherein the amount was calculated on a basis of 95% of the amount required for complete neutralisation of free fatty acids.

TABLE 3 chicken fat mixture for cats

| Ingredient | Amount (wt % by total weight of mixture) |
|---|---|
| Premium Chicken Fat | 87-89 |
| Water | 9-11 |
| Yeast flavorant | 0.5-0.8 |
| Amino acids (including cysteine and methionine) | 0.2-0.4 |
| Sugars | 0.5-1.5 |
| Vitamins (including thiamine) | 0.1 to 0.2 |
| NaOH* | 0.2 |

*Using the AOCS Ca 5a-40 titration method described herein, it was determined that premium chicken fat contained free fatty acids in an amount of 1 wt %. The amount of NaOH to be added was calculated accordingly using the formula described above, wherein the amount was calculated on a basis of 95% of the amount required for complete neutralisation of free fatty acids.

Depending on the formula, an aqueous blend was prepared by blending the edible agents indicated in Tables 2 and 3, water, and sodium hydroxide in a Warring Blender. The blend was then transferred to a 4-gal vessel equipped with a scrap-surface agitator. The vessel was jacketed by stainless steel walls, between which water was circulated using a Sterling Water Temperature Control Unit (model M2B-2010-D). The fat ingredient (either Choice White Grease (dogs) or chicken fat (cats) was subsequently introduced into the vessel, with the temperature maintained slightly below 43° C. (110° F.). Prior to heating, the aqueous blend was combined with the fat source, and mixed for a period of 3 minutes. During this period, the flavor solution neutralized free organic acids inherent in the fat source. The lid of the vessel was closed but its venting port was left open throughout the process. Therefore, the vessel was not pressurized during the process. The agitator was maintained at a constant speed of 40 rpm in order to maintain a good mixing action inside the vessel. Then, the temperature of the raw material mix was increased at a rate of approximately 1.5° C. per minute until reaching 97.8° C. (~208° F.), after which the mixture was maintained at 97.8° C. (~208° F.) for 38 minutes. The mixture was subsequently cooled to 65.5° C. (~150° F.) at a rate of approximately −1° C. per minute. Natural antioxidants were added at this stage to maintain anti-oxidative stability for a period of at least 18 months. The processed mixture was then centrifuged at a 20% power level using an electric centrifuge (model IEC EXD, International Equipment Co., Needham Heights, Mass.) for 30 seconds in order to separate the aqueous sediment from the processed fat. After siphoning off the heavy aqueous phase, the processed fat was packaged in a 5-gal plastic pail.

Example 2

Appearance of Processed Fat

Figure 1B:
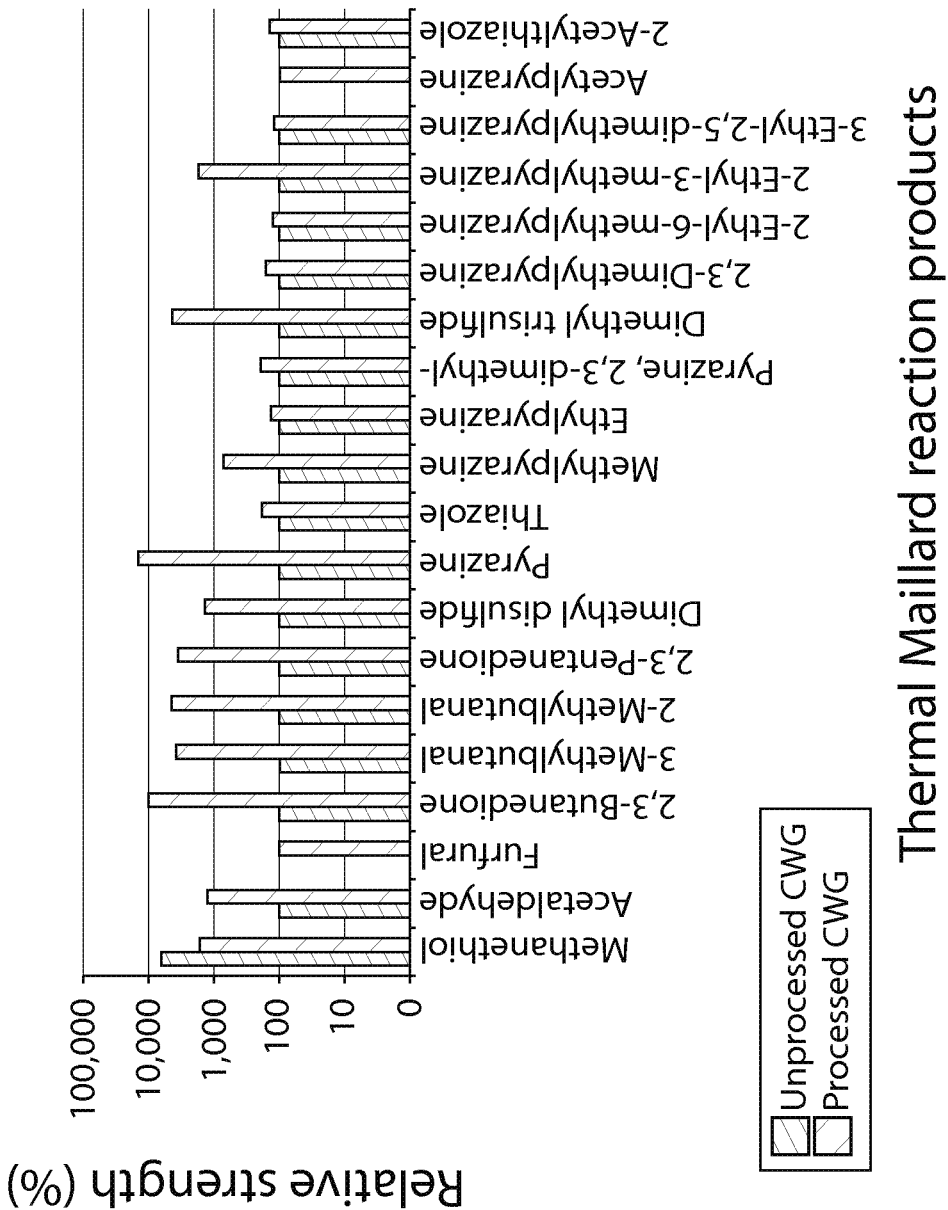
FIG. 1B is a bar chart illustrating the change in non-fatty acid volatile compounds in animal fat (Choice White Grease) prior to and after processing according to the present invention.

A color analysis of the processed fat obtained in Example 1 was conducted and compared to untreated fat. The method of the present invention improves the appearance of pork fat by brightening up the color of the raw material. In particular, it was observed that the processed fat (BBQ pork fat) was less "cloudy" than the untreated control. This is illustrated in FIG. 1. The cloudiness may be attributed to proteinaceous residues from rendering and sediments of spent flavor reactants. These were removed in the centrifugation step. The color change was further confirmed by measuring Hunter's color values as shown in Table 4. The brightness of BBQ Pork Fat (54.1) is significantly higher than that of non-treated Pork Fat (40.0). The color of the BBQ Pork Fat is a stronger yellow and has less red hues as expressed by its higher Hunter's a value (13.3) and lower Hunter's b value (39.1) than that of untreated pork fat (a=11.6 and b=46.9). The color measurements, in combination, indicate that the color of the raw material has drifted from a brown hue (darker red and blue) to a creamy yellow color (brighter yellow and green) as a result of processing according to the present invention.

TABLE 4

Color measurements of CWG (control) and BBQ pork fat (test)

| Sample*[a] | N | L | a* | b* |
|---|---|---|---|---|
| Pork Fat | 6 | 40.0[b] | 13.3[a] | 39.1[b] |
| BBQ Pork Fat |   | 54.1[a] | 11.6[b] | 46.9[a] |

Note:
[a]Color of samples was measured using a Minolta Colorimeter when both samples were in the solidified state.
[b]Means denoted by different letters are different at $p < 0.05$ level.

Example 3

Microbial Activity

The process of the present invention improves the food safety of animal fats by its capability to eliminate microbial contaminants in the ingredient. The raw animal fat sample (Premium Chicken Fat (M0710)) was spiked with $4.2 \times 10^6$ cfu/g non-pathogenic aerobic microorganisms as illustrated in Table 5. After subjecting the fat to the process of Example 1, the processed Roasted Chicken Fat had no detectable aerobic microorganisms (<10 cfu/g). This confirms that the method of the present invention is capable of removing totally the microbial contaminants in the spiked raw material. As mentioned above, fat tends to encapsulate and insulate microorganisms, which are consequently very difficult to deactivate by dry heat. By introducing the aqueous flavor blend, the method of the present invention is able to remove all microbial contaminants, and thus improve the food safety of the raw material.

TABLE 5

Total aerobic plate counts in different fat samples

| Sample | Total Plate Counts (cfu) |
|---|---|
| Premium Chicken Fat (M0710) (Control) | $4.2 \times 10^6$ |
| Roasted Flavor Fat (BP10479) (Test) | <10 |

Example 4

Reduction in Odor

The method of the present invention improves the aroma perception of both Pork Fat and Chicken Fat as determined by human sensory evaluations and chemical analyses. The following studies demonstrate that the method of the present invention is able to create and enhance meaty aromas. For the first study, a BBQ Pork Fat formula was processed from Pork Fat as described in Example 1, to achieve the flavors of dripped bacon fat for canine consumption. For the second study, Roasted Chicken Fat was processed from the Premium Chicken Fat to achieve the flavors of roast chicken or turkey for feline consumption. The difference in aroma perception between the raw and processed materials was determined using a human sensory evaluation followed by chemical analysis using GC-Mass spectrum.

Figure 2A:
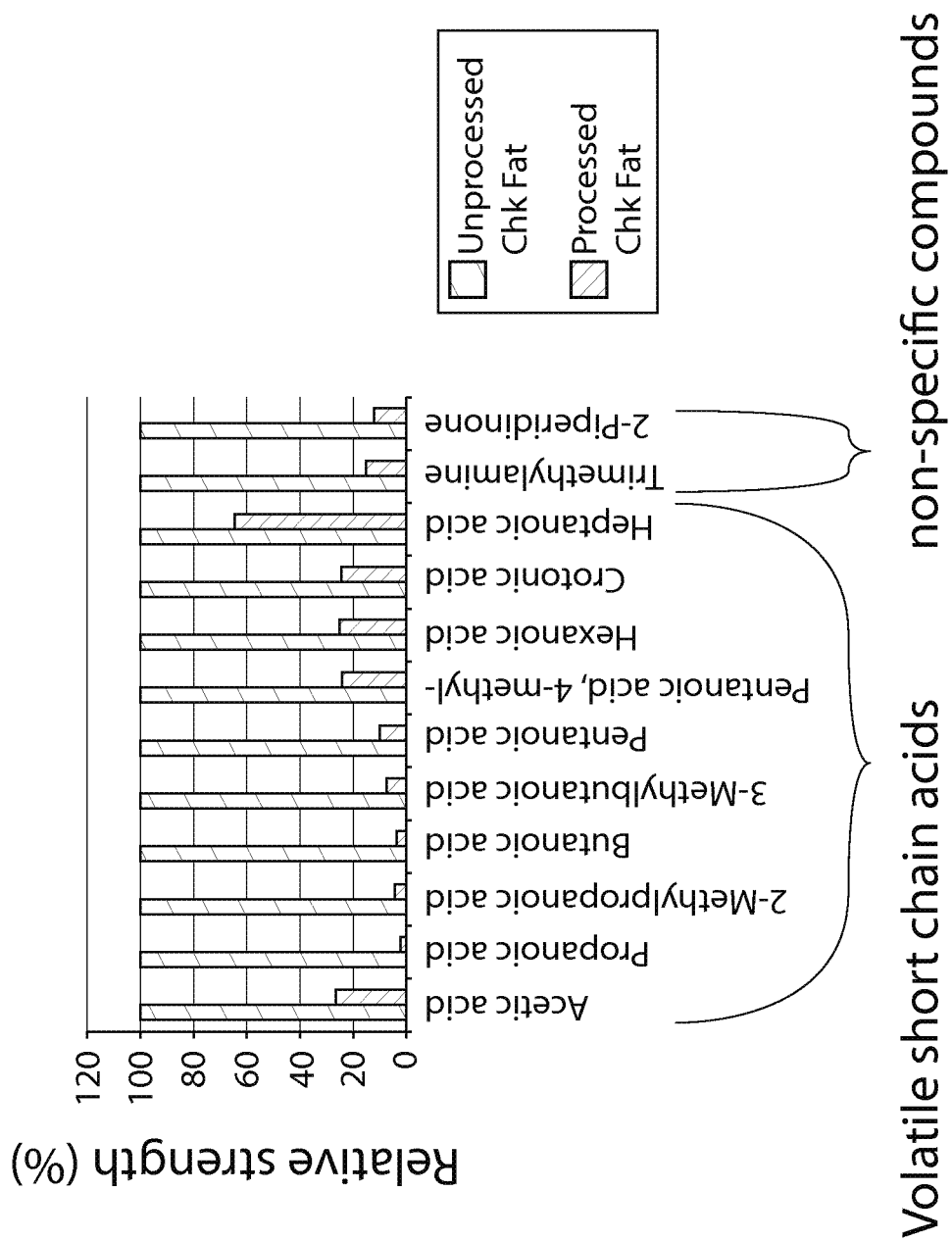
FIG. 2A is a bar chart illustrating the change in short fatty acid content in animal fat (Premium Chicken Fat) prior to, and after, processing according to the present invention, as determined by GC-mass spectrometry using a solid phase micro-extraction method.

The results of the aroma analysis of BBQ Fat (processed according to the present invention) versus Choice White Grease (control) using a GC-Mass Spectrum method is illustrated in FIG. 2A. It can be seen, that the method of the present invention successfully withdrew the odorous compounds while increasing levels of a few aromatic compounds, which may appeal to humans. Short chain volatile acids such as acetic, propionic, butanoic acids, etc. and their branched chain derivatives such 2-Methylpropanoic acid, 3-methylbutanoic acid, etc. are pungent and volatile, and may cause pungent, animalic, and sour odors when combined with other organic compounds present in inedible animal fat such as p-cresol, skatol, or indole. The branched chain volatile acids, which can be produced inside an animal's digestive tract or during the biological breakdown after death by microbial fermentation, have a higher impact on odors than the straight chain volatile acids. FIG. 2A shows a disappearance of formic, octanoic, nonanoic, and decanoic acids in the processed fat. In addition, the relative strength of $C_2$ to $C_6$ straight chain and branched chain volatile acids in the BBQ Fat has significantly decreased by 5 to 20 fold as compared to the raw material, Choice White Grease.

Figure 2B:
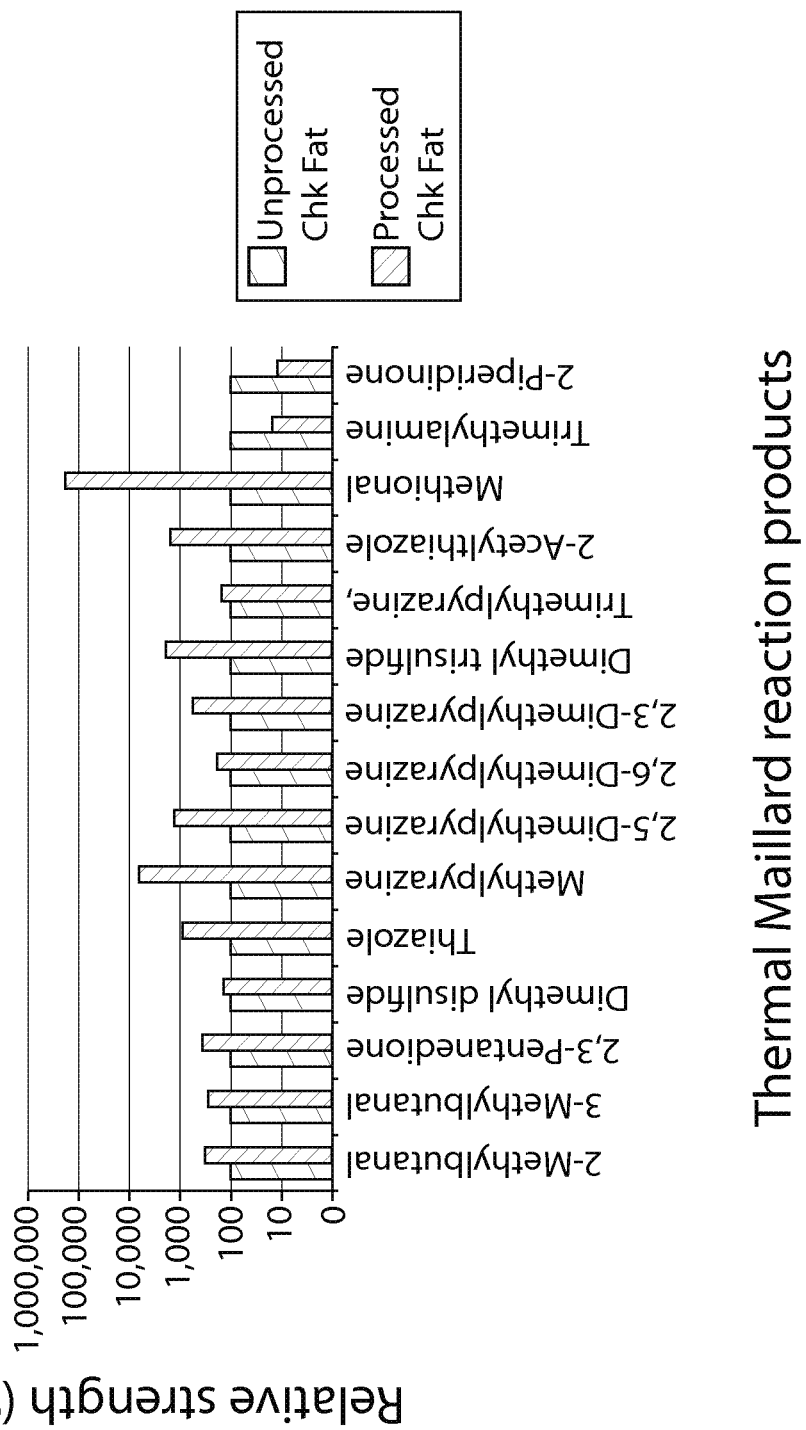
FIG. 2B is a bar chart illustrating the change in non-fatty acid volatile compounds in animal fat (Premium Chicken Fat) prior to, and after processing according to the present invention.

With the removal of odorous compounds in the BBQ Fat, creation or strengthening the concentration of desirable aromatic compounds in the BBQ Fat such as furfural, pyrazine, aldehydes, etc. through Maillard reactions may help to improve the aroma perception of the BBQ Fat. As shown in FIG. 2B, furfural and acetylpyrazine are newly formed during the process of the present invention. Furfural has a sweet and caramel-like aroma, while acetylpyrazine smells like popcorn and nuts. The relative strength of volatile compounds such pyrazines, methanthiol, butane-dione, etc. increased from 10 to 100 times as a result of Maillard reactions in the processed fat. Those Maillard reaction compounds usually contribute to desirable cooked and baked aromas like "browning", "creamy", and "nutty" aromas.

Figure 3:
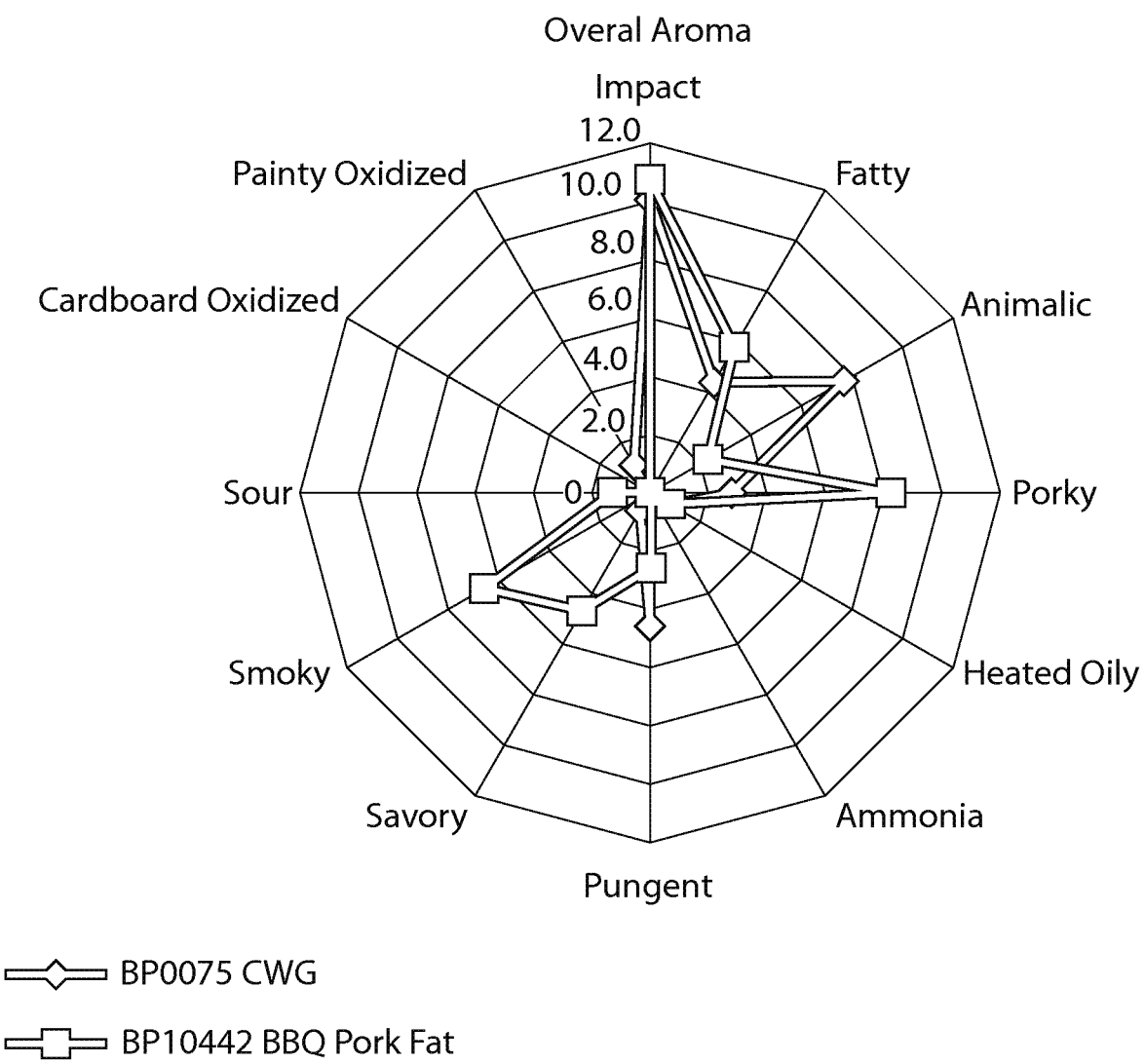
FIG. 3 is a spider diagram illustrating the distribution of mean hedonic scores of BBQ Fat versus Choice White Grease in relation to different sensory attributes.

The results of the aroma analysis of Roasted Chicken Fat (processed according to the present invention) versus Premium Chicken Fat (control) using a GC-Mass Spectrum method is illustrated in FIG. 3A. Similar to the results of the Choice White Grease study, the contents of volatile acids in the Roasted Chicken Fat have reduced from 4 to 50 times as compared to the levels in the unprocessed fat, with the exception of heptanoic acid. Interestingly, FIG. 3A also shows significant reductions in both trimethylamine (TMA) and piperidione in the Roasted Chicken Fat. TMA is a known odorant in degrading seafood while piperidione has a strong ammonia- and pepper-like odor. A combination of both TMA and piperidione in the Chicken Fat may make it smell rotten or putrid, which was in fact observed by the operators and authors during the experiment. Significant reductions of both odorants may help to improve the aroma perception of the treated Chicken Fat. The savory and meaty aromas such as thiazole, dimethyl trisulfide, 2-acetyl thiazole, and methional were significantly enhanced in the Roasted Chicken Fat as compared to the untreated Chicken Fat, as shown in FIG. 3B. These sulfur-containing volatiles may enhance the perception of a meaty aroma in the processed sample. Unlike the BBQ Pork Fat, the enhancements in fatty and nutty aromas in the Roasted Chicken Fat were only moderate. This is consistent with the flavor production that was intended, as a bland and "brothy" type of aroma profile is preferred by felines.

Example 5

Sensory Evaluation

Figure 4:
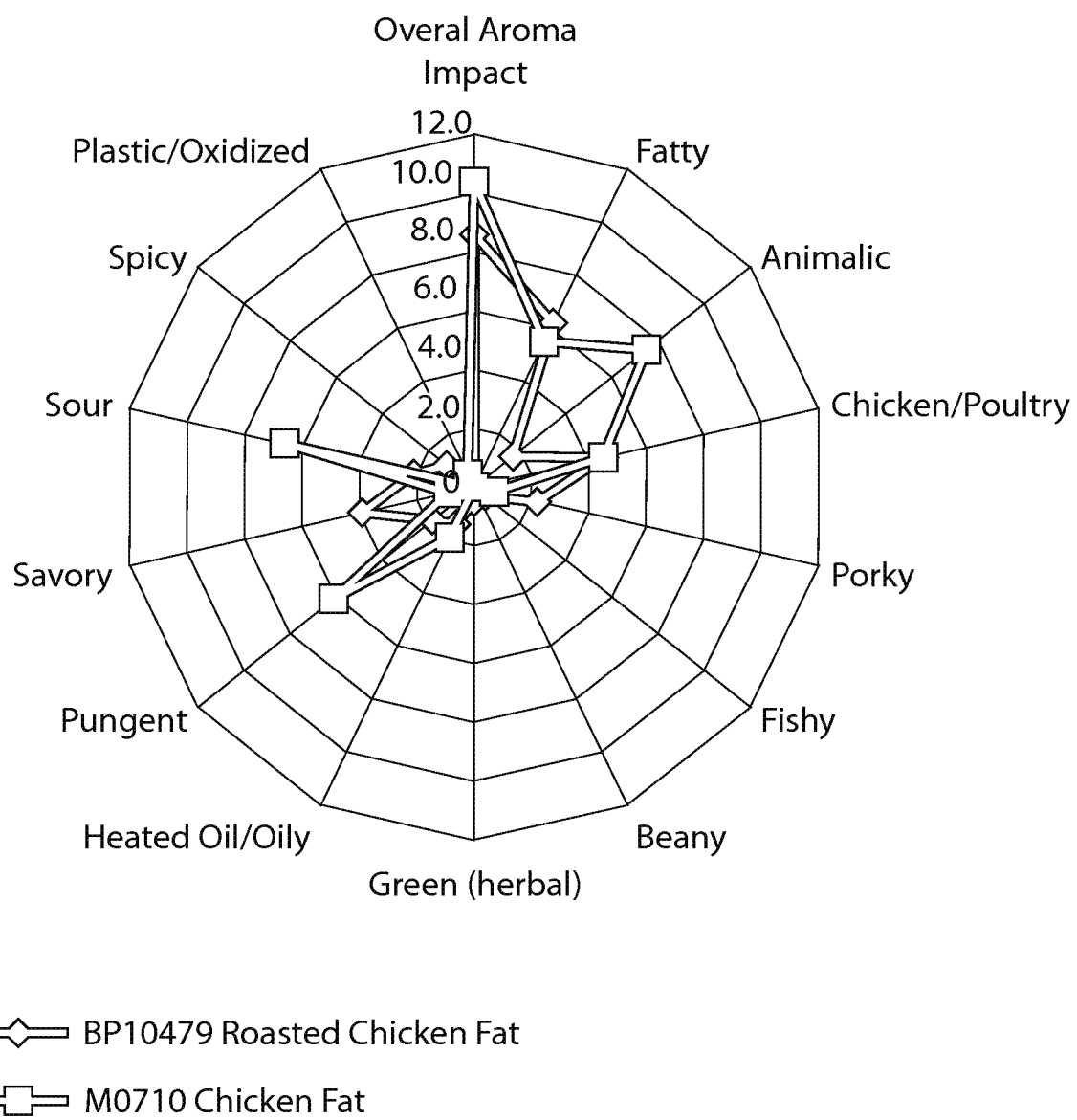
FIG. 4 is a spider diagram illustrating the distribution of mean hedonic scores of Roast Chicken Fat versus unprocessed Premium Chicken Fat in relation to different sensory attributes.

Results of a human sensory evaluation using a Quantitative Descriptive Analysis (QDA) methodology for the BBQ Fat versus the untreated Choice White Grease confirm the results of the aroma analyses. As shown in Table 6 and FIG. 4, both animalic and pungent notes in the BBQ Fat are significantly reduced, which could be attributed to the reduction of volatile short chain acids in the BBQ Fat. The perceptions of fatty, porky, savory, and smoky aromas are significantly increased in the BBQ Fat over the Choice White Grease, which could be attributable to the new creation and strengthening of the Maillard reaction compounds. However, the method of the present invention does not affect the sensorial perception of other aromas like oxidation, heated oil smell, or sourness.

TABLE 6

Hedonic scores of different aroma attributes for either BBQ fat of Choice White Grease analysed by at least 10 trained human panellists using a QDA method

| Attributes | p-value | Pork Fat, M0075 (Batch Code: 7120725100) | BBQ Pork Fat, BP10442 |
|---|---|---|---|
| Overall Aroma Impact | 0.10 | 10.1 | 10.8 |
| Fatty | 0.0019 | 4.4b | 5.8a |
| Meaty | <0.0001 | 2.8b | 8.3a |
| Savory | <0.0001 | 0.7b | 4.7a |
| Smoky | <0.0001 | 0.3b | 6.6a |
| Heated oil | 0.48 | 0.6 | 0.8 |
| Pungent | 0.01 | 4.6a | 2.6b |
| Gamy | <0.0001 | 7.7a | 2.3b |
| Sour | 1.00 | 1.3 | 1.3 |
| Cardboard, oxidized | 0.33 | 0.2 | 0.0 |
| Painty, oxidized | 0.11 | 1.1 | 0.0 |

Note:
aMeans in the same row denoted by different letters are not different at the p < 0.05 level.
bScore for each sensory attribute was the mean of rating among at least 10 panelists on a 15-point universal scale basis.

A human sensory evaluation revealed that the Roasted Chicken Fat was perceived with more meaty, savory, and spicy aromas and less gamy, pungent, and sour characteristics than the non-treated Chicken Fat. The results are illustrated in Table 7 and in FIG. 5. Overall, the non-treated Chicken Fat sample smelled stronger than the Roasted Chicken Fat. As the intention of the Roasted Chicken Fat formulation was to create a bland and "brothy" aroma profile for felines, the current approach did reduce the overall aroma strength from the raw material. Similar to the BBQ Pork Fat for canines, the methods of the present invention enhanced the meaty and savory aromas in the Roasted Chicken Fat. The method of the present invention did not impact on other aroma attributes in Chicken Fat such as "fishy", "beany", "green", or "heated oil" aromas. The panelists also indicated the Roasted Chicken Fat had stronger "spicy" aroma, of which the cause and impact are currently unknown.

TABLE 7

Hedonic scores of different aroma attributes for either BBQ Fat or CWG analyzed among at least 10 trained human panelists using a QDA method.

| Attributes | p-values | Chicken Fat, M0710 Batch#: 8121114003 | Roasted Chicken Fat, BP10479 |
|---|---|---|---|
| Overall Aroma Impact | 0.0006 | 10.4a | 8.6b |
| Fatty | 0.18 | 5.5 | 6.2 |
| Chicken/Poultry | 0.05 | 4.5 | 4.5 |
| Meaty | 0.05 | 0.71b | 2.2a |
| Savory | 0.0007 | 0.9b | 3.9a |
| Gamy | <0.0001 | 7.5a | 1.7b |
| Fishy | 0.33 | 0.0 | 0.5 |
| Beany | 0.10 | 0.0 | 0.4 |
| Green (or herbal) | 0.11 | 0.0 | 0.5 |
| Heated oil | 0.53 | 1.9 | 1.4 |
| Pungent | <0.0001 | 6.1a | 1.8b |
| Sour | <0.0001 | 6.6a | 2.1b |
| Spicy | 0.02 | 0.0 | 1.2 |
| Plastic/Oxidized | 0.33 | 0.5 | 0.0 |
| Comments | | Putrid (rotten) | Roasted (meat/skin) |

Note:
aMeans in the same row denoted by different letters are not different at the p < 0.05 level.
bScore for each sensory attribute was the mean of rating among at least 10 panelists on a 15-point universal scale basis.

Example 6

Food Preparation for Palatability Tests

Both dog and cat food samples were prepared separately for conducting palatability tests. To prepare a dry kibble base, grain mix was extruded using a Wenger X85 Single Screw Extruder, and then dried sufficiently to obtain a 5% moisture mix for cat food and an 8.5% moisture mix for dog food. As test compositions for dogs, the dry kibbles were coated with 7.1% of the processed fat prepared in Example 1 ("BBQ Fat"). As test compositions for cats, the dry kibbles were coated with 11.7% of the processed fat prepared in Example 1 ("Roasted Chicken Fat"). Control compositions were prepared by coating the dry kibbles with the corresponding unprocessed pork fat-based Choice White Grease (dogs) or unprocessed chicken fat (cats).

After processing, the food was properly packaged and stored inside an air conditioned warehouse before the animal feeding (palatability) tests.

Example 7

Animal Feeding Study (Palatability Test)

The difference in palatability between the test and control diets prepared in Example 6 for each species was determined using an animal taste panel which consisted of 25 animals (for each species). The animals were fed over a 2-day period following an internal standard feeding protocol (MP26.2.0.0-S-C-D-PAL-MULTI-2-TEST for dogs and MP34.1.0.0-S-F-D-PAL-MULTI-2-TEST for cats.) Essentially, each animal was presented with two containers of food, each containing a measured amount of the test composition and control composition, respectively, where the measured amount was more than the animal was expected to consume. The palatability test for each species was repeated once to increase the reliability of the data obtained, thus expanding the total panel size to 50 animals for each species. Both preference and intake ratio were determined to assess the palatability of food samples. For each animal tested, preference between the food samples was assigned either to the test food or to the control food, based on the quantity of each food consumed. The intake ratio of the test food represents the ratio of the amount of the test diet consumed relative to the total amount of food consumed (i.e. consumption of both test and control foods) during a feeding session. Similarly, the intake ratio of the control diet represents the ratio of the amount of the control diet consumed relative to the total amount of food consumed (i.e. consumption of both test and control foods) during a feeding session. Thus, a high food intake ratio for the test food, and a low intake ratio for control food indicates increased palatability. The palatability was assessed by determining the average intake ratios of the test and control diet, for each animal, and analysing the data using a Student T-test on a 95% confidence level. Thus a "win" or "loss" of the test food versus the control food was assigned only when the probability of the difference between the two averaged intake ratios was less than 0.05 on a single tail T-distribution. Otherwise, the palatability of the test diet would be considered to be at parity with the control diet.

The results of the palatability tests are illustrated in Table 8 (dogs) and Table 9 (cats).

TABLE 8

Feeding results - dogs

| PAL Test No | n (Numbers of dogs) | Test Food | Control Food | Verdict | Pref. | IR |
|---|---|---|---|---|---|---|
| 75215 | 25 | 508818 K9 Adult | 508810 K9 Adult | Win p = 0.0001 | 84/12 | 0.729 |
| 77819 | 25 | Small Bites, | Small Bites, | Parity p = 0.32 | 48/44 | 0.489 |
| Combined | 50 | BBQ Fat | CWG | Win p = 0.001 | 66/28 | 0.609 |

TABLE 9

Feeding results - cats

| Test No | n (Numbers of cats) | Test Diet | Control Diet | Verdict | Pref. | IR |
|---|---|---|---|---|---|---|
| 77348 | 25 | 510994 Fel c/d | 510995 Fel c/d | Win p = 0.01 | 58/29 | 0.581 |
| 77613 | 25 | MC Roasted | MC Chicken | Win p = 0.01 | 73/23 | 0.566 |
| Combined Results | 50 | Chk Fat | Fat | Win p = 0.001 | 70/26 | 0.574 |

It can be seen from Table 8 that dogs prefer the BBQ pork fat processed according to the present invention, to the unprocessed pork fat (Choice White Grease). As indicated in Table 8, the composite palatability results from 50 dog panelists show dogs prefer Hill's Canine Adult diet containing 7.1% of BBQ pork fat (test food) to that containing the non-treated pork fat (control food) at a 2.4 to 1 preference ratio (or 66/28) and a significantly higher intake ratio of 0.609 on a 99.9% confidence level (or a probability of 0.001). Both the test and control foods used the same dry kibble base. The test food was coated externally with 7.1% of BBQ pork fat while the control food was coated with the same amounts of the non-treated pork fat.

It can be seen from Table 9 that cats strongly preferred Hill's Feline c/d Multicare containing the Roasted Chicken Fat (test food) to that containing non-treated premium chicken fat (control food). Table 8 shows the composite taste preference for the test food to the control is at a ratio of 2.7 to 1 (or 70/26). The average intake ratio for the test food (0.574) is significantly higher than that of the control, as estimated on a 99.9% confidence level. As with the canine study, the same dry kibble base was coated externally with 11.7% of Roasted Chicken Fat for the test food and non-treated premium chicken fat for the control, respectively.

From the above data, it may be concluded that animal fat processed according to the methods of the present invention is effective at enhancing the palatability. Moreover, the above data further demonstrate that fat processed according to the methods of the present invention may be used to replace the total fat content of formulae, whilst still enhancing palatability.

Results of the studies presented herein clearly demonstrate that the methods of the present invention improve the appearance of animal fat, eliminate microbial contamination, withdraw odorous compounds while forming desirable volatile compounds so to improve the aroma perception of the treated material, and further improve the palatability of animal fat. Therefore, it can be confidently concluded that the methods of the present invention are useful for converting feed grade raw materials into pet food ingredients which have a quality, aroma profile, and palatability comparable to premium pet food ingredients or even human grade ingredients.

Whilst particular embodiments of the invention have been illustrated and described, it will be obvious to those skilled in the art that various changes and modifications may be made without departing from the scope of the invention as defined in the appended claims.

What is claimed is:

1. A method of preparing a palatability enhancer for a food composition, comprising:
    combining an animal fat source, one or more edible agents, an alkaline agent and water at a temperature of up to 45° C. to form a mixture,
    wherein the animal fat source comprises free fatty acids and animal fat,
    wherein the edible agents are selected from amino acids, sugars, vitamins, flavorants and flavor precursors, and
    wherein the alkaline agent is present in an amount that does not exceed the amount required to neutralize the fatty acids in the animal fat source;
    determining an amount of the free fatty acids in the animal fat source; and
    neutralizing 90 wt % to 99 wt % of the free fatty acids in the animal fat source with the alkaline agent without saponification of the animal fat from the animal fat source;
    heating the mixture to a temperature of 96° C. to 99° C. for at least 35 minutes; and
    obtaining a palatability enhancer from the mixture;
    wherein the method is conducted under ambient pressure.

2. The method according to claim 1, wherein the palatability enhancer consists essentially of the animal fat.

3. The method according to claim 1, wherein the amino acids are in the mixture in an amount of from 0.05 wt % to 0.5 wt %.

4. The method according to claim 1, wherein the sugars are selected from dextrose, glucose, fructose, maltose, lactose, arabinose, xylose, ribose, mannose, erythrose, threose and galactose, and wherein the sugars are in the mixture in an amount of from 0.1 wt % to 4 wt %.

5. The method according to claim 1, wherein the flavorants are in the mixture in an amount of from 0.1 wt % to 4 wt %.

6. The method according to claim 1, wherein the flavor precursors is an intact protein or a hydrolysed protein, and wherein the flavor precursors are in the mixture in an amount of 0.5 wt % to 3 wt %.

7. The method according to claim 1, wherein a vegetable oil is further incorporated into the mixture.

8. The method according to claim 7, wherein the vegetable oil is selected from the group consisting of soybean oil, rapeseed oil, coconut oil, palm oil, peanut oil, corn oil, sunflower oil, safflower oil and cottonseed oil.

9. The method according to claim 7, wherein the vegetable oil is in an amount of from 0.5 wt % to 3 wt %.

10. The method according to claim 1, wherein the animal fat source consists essentially of fats or tallows extracted and separated by rendering animal parts, wherein the animal parts comprise offal, bones, trims from meat fabrication, hides, skins, blood, and carcass.

11. The method according to claim 1,
    wherein obtaining the palatability enhancer from the mixture comprises isolating a fraction from the mixture,
    wherein the isolated fraction comprises the animal fat in an amount of at least 90 wt %, and
    wherein the palatability enhancer comprises the isolated fraction.

12. The method according to claim 11, wherein during isolation of the fraction comprising the animal fat, the fraction is separated from an aqueous phase of the mixture and the fraction comprising the animal fat is isolated from the mixture at a temperature of from 85° C. to 90° C.

13. The method according to claim 12, wherein the aqueous phase of the mixture comprises the neutralized fatty acids.

14. The method of claim 1, wherein the amount of the alkaline agent present is from 90 wt % to 99 wt % of an amount required to neutralize all the free fatty acids in the animal fat source.

* * * * *